D. J. HALL.
LAND WORKER.
APPLICATION FILED MAY 3, 1917.
1,282,817.  Patented Oct. 29, 1918.
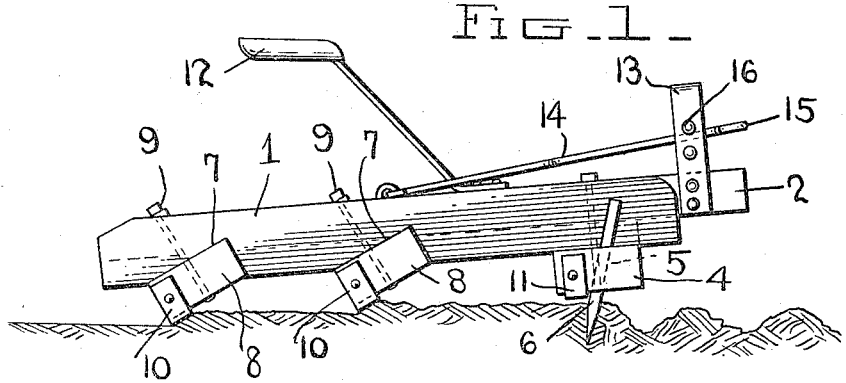
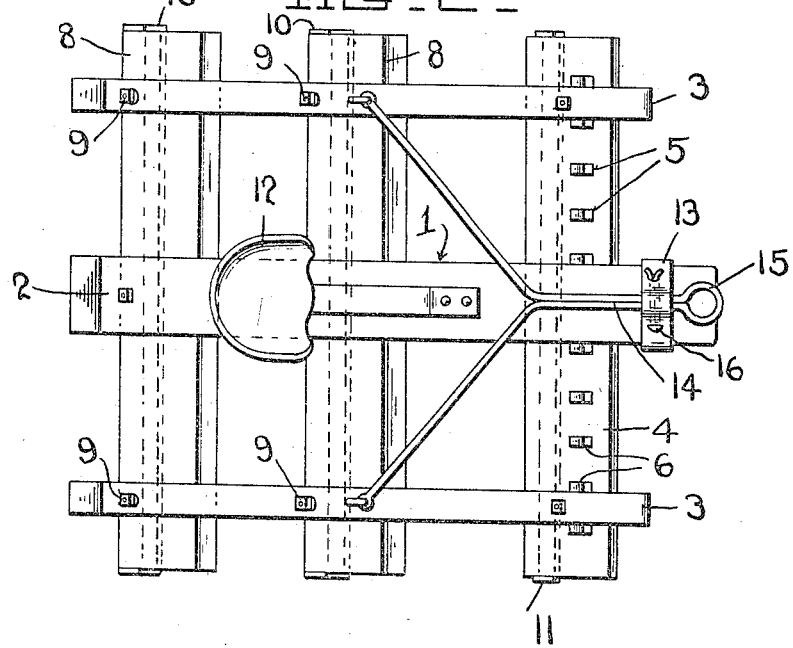
INVENTOR
David James Hall
WITNESSES
BY
ATTORNEY

UNITED STATES PATENT OFFICE.

DAVID J. HALL, OF WILMINGTON, DELAWARE.

LAND-WORKER.

1,282,817.   Specification of Letters Patent.   Patented Oct. 29, 1918.

Application filed May 3, 1917. Serial No. 166,220.

*To all whom it may concern:*

Be it known that I, DAVID JAMES HALL, a citizen of the United States, residing at Wilmington, in the county of New Castle and State of Delaware, have invented certain new and useful Improvements in Land-Workers, of which the following is a specification.

This invention relates to improvements in farm implements and the principal object of the invention is to provide a device of this character which will thoroughly work up the plowed ground so as to pulverize the soil and leave a fine dust mulsh to retain the moisture.

Another object of the invention is to provide a combined harrow and drag arranged with the harrow teeth in front and set on an incline so as not to rake up trash and the like and to leave the ground ready to be acted on by the crushing bars behind.

A further object of the invention is to place the crushing bars in recesses in the frame beams so that one side and one end of each bar bears against the beams and said bars are so mounted in the beams that the dragging action tends to hold the bars in the said recesses.

A further object of my invention is to provide a device including a draft bar which may be adjusted to various angles with relation to the frame of the implement.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:

Figure 1 is a side view, showing the invention in use.

Fig. 2 is a plan view.

In these figures, 1 represents the frame composed of the middle beam 2 and the two end beams 3. These beams are spaced apart and at their front ends are secured to the transverse beam 4. The beam 4 rests against the bottom of the frame and is provided with the openings 5 inclined rearwardly to receive the harrow teeth 6. To the rear of this beam 4 the frame beams are provided with recesses 7, said recesses being of right angular shape with the top side thereof longer than its other side and these recesses receive the crushing bars 8 of rectangular shape and of such a size that they fit into the recesses in such a manner that one side and one end thereof come in contact with the sides of the recesses and the said bars are held in place in the recesses by means of the bolts 9 passing through the frame beams at an angle, as shown in Fig. 1. The bottom edge of each crusher bar is reinforced by a metal strip 10, having its ends bent over the ends of the bar. The front bar carrying the harrow teeth is also provided with a reinforcing strip 11, similar to the strip 10. The middle bar 2 of the frame carries the seat 12 and the vertically arranged loop 13 for the draft bar, said draft bar 14 being preferably formed of one piece of steel having its ends secured to the bars 3 and converging to a point over the middle bar, where the parts of the steel are brought together and pass parallel with the middle bar and end in the loop 15 to receive the double trees. The draft bar may be regulated vertically in relation to the implement by means of the pin 16.

In use, the teeth come in contact with the plowed ground first and as these teeth incline toward the rear they will not rake up corn stalks or other trash, but will have a tendency to bury them. The teeth break up the clods and smooth the ground somewhat and the crusher bars will further reduce the clods and at the same time smooth the ground so it will be in proper condition for receiving the seed.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A cultivator including a pair of side beams and a middle beam, a draft bar formed of one piece of metal having its ends secured to the side beams and converging to a point over the middle beam and extending in parallel relation to each other, and means for adjusting said draft bar to various angles in relation to said beams.

2. A cultivator including a pair of side beams and a middle bar, a loop carried by the forward ends of said middle bar and having a plurality of alining openings in its arms, a pin associated with the openings in said loop, and a draft bar formed of one piece of metal having its ends secured to the side beam and converging to a point over the middle bar and extending in parallel relation between the arms of the loop.

In testimony whereof I affix my signature in presence of two witnesses.

DAVID J. HALL.

Witnesses:
JOSEPH A. HANLEY,
JOHN J. HANLEY.

Copies of this patent may be obtained for five cents each, by addressing the "Commissioner of Patents, Washington, D. C."